United States Patent [19]

Lew

[11] Patent Number: 4,635,485
[45] Date of Patent: Jan. 13, 1987

[54] PRECESSION FLOW METER

[76] Inventor: Hyok S. Lew, 7890 Oak St., Arvada, Colo. 80005

[21] Appl. No.: 748,183

[22] Filed: Jun. 24, 1985

[51] Int. Cl.⁴ .............................................. G01F 1/80
[52] U.S. Cl. ................................................. 73/861.37
[58] Field of Search ........... 73/861.35, 861.36, 861.37, 73/861.38

[56] References Cited

U.S. PATENT DOCUMENTS

| | | | |
|---|---|---|---|
| 2,934,951 | 5/1960 | Li | 73/861.35 |
| 3,218,851 | 11/1965 | Sipin | 73/861.37 |
| 3,329,019 | 7/1967 | Sipin | 73/861.37 |

Primary Examiner—Herbert Goldstein

[57] ABSTRACT

A flow meter measures the time rate of mass flow by measuring the torque or torsion associated with the nutation of the spinning fluid created by a forced oscillation of the spinning axis of the spinning fluid flowing through a conical shell wherein the spinning movement is imposed on the fluid entering through a port disposed at the diverging extremity of the conical shell by a plurality of spiral flow guides, which spinning movement becomes accelerated as the fluid approaches the converging extremity of the conical shell. An oscillating motion imposed on the converging extremity in a first direction perpendicular to the spinning axis coinciding with the central axis of the conical shell produces a precession torque or torsion creating an oscillating motion in a second direction perpendicular to the first direction as well as to the spinning axis, wherein the time rate of mass flow is measured by measuring the oscillating motion in the second direction.

20 Claims, 7 Drawing Figures

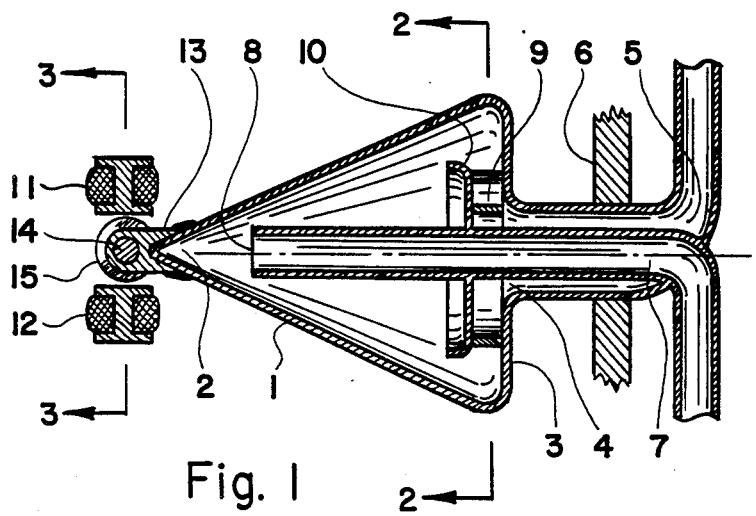
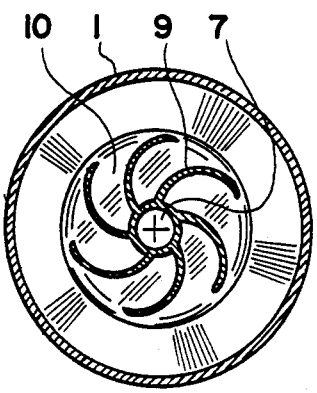
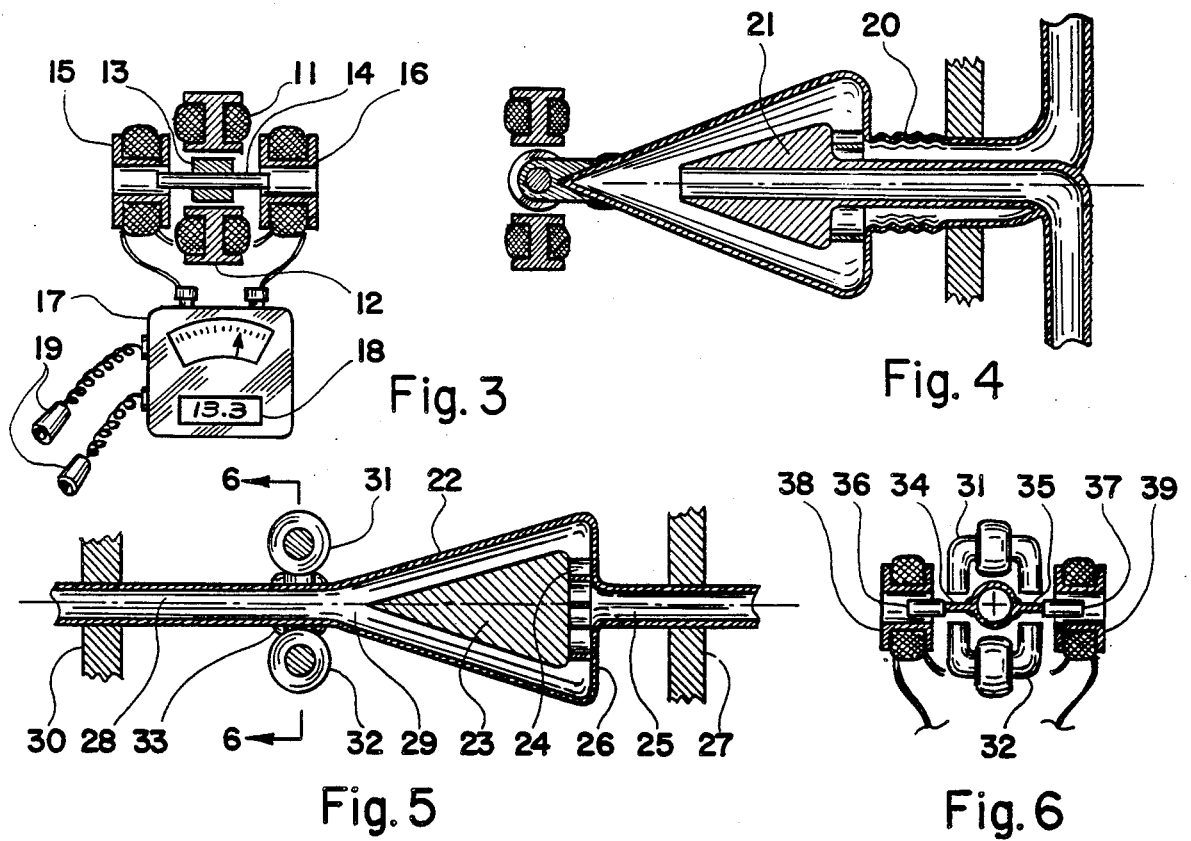
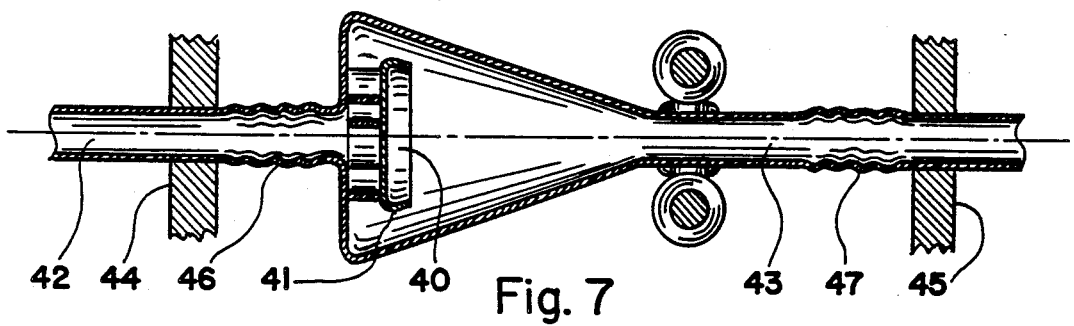

PRECESSION FLOW METER

BACKGROUND OF THE INVENTION

In recent times, the type of flow meter known as the coriolis force flow meter has been successfully developed wherein a U-tube or a 360 degree loop of tube containing moving fluid is oscillated in a direction perpendicular to the plane including the loop of the tube or U-tube on the plane of symmetry dividing the U-tube or a loop of tube into two equal halves and the torque or torsion about an axis coinciding with the line of intersection between the plane including the loop of the tube and the plane of symmetry dividing the loop of the tube into two equal halves is measured to indicate the time rate of mass flow of the fluid through the loop of the tube. Although the coriolis force type flow meter is accurate and reliable when it is used to measure reasonably low rates of flow of a liquid medium, it has been unsuccessful to measure the flow rates of gaseous media or fluid flow at a very low rate. The flow of a gaseous medium does not generate a precession torque large enough to be detected by a coriolis force flow meter using a vibrating loop of tube, while the aforementioned type of flow meter is not suitable to measure the flow rate of fluid at a high flow rate in terms of difficulties encountered in the construction and operation thereof.

Although many inventors and engineers pioneering the art of the coriolis flow meter technology have failed to understand the operating principles thereof, it is quite clear that a coriolis force flow meter operates in the same principle as the mechanics of a spinning top. When the spinning axis of a spinning top deviates from a perfectly vertical axis, the spinning top nutates about the vertical axis while it spins about its own spinning axis. A coriolis force flow meter with a greater sensitivity and broader applicability can be constructed in structures utilizing the mechanics of the spinning top.

The primary object of the present invention is to provide a precession flow meter operating on principles similar to the mechanics of spinning tops.

Another object is to provide a precession flow meter including a conical shell with a fluid inlet disposed at the diverging extremity thereof wherein a plurality of radially disposed spiral flow quides impose spinning movement on the fluid entering therethrough.

A further object is to provide a precession flow meter including a fluid outlet disposed at the converging extremity of the conical shell.

Yet another object is to provide a precession flow meter including means disposed at the converging extremity of the conical shell for imposing oscillatory movements of the converging extremity relative to the diverging extremity thereof on a first plane including the central axis of the conical shell.

Yet a further object is to provide a precession flow meter including means for measuring the amplitude of the vibratory movements of the converging end of the conical shell taking place on a second plane including the central axis of the conical shell and perpendicular to the first plane on which the oscillatory movement is imposed.

Still another object is to provide a precession flow meter including means for converting the amplitude of the vibratory movement of the converging extremity of the conical shell on the second plane to the mass flow rate of the fluid passing through the conical shell.

Still a further object is to provide a precession flow meter wherein the converging extremity of the conical shell is oscillated at a resonance frequency of the vibrating system including the conical shell and the fluid moving therethrough.

These and other objects of the present invention will become clear as the description thereof proceeds.

BRIEF DESCRIPTION OF THE FIGURES

The present invention may be described with a great clarity and specificity by referring to the following figures:

FIG. 1 illustrate a cross section of an embodiment of the precession flow meter constructed in accordance with the principles of the present invention FIG. 2 illustrates another cross section of the embodiment shown in FIG. 1.

FIG. 3 illustrates a further cross section of the embodiment shown in

FIG. 4 illustrates a cross section of another embodiment of the precession flow meter.

FIG. 5 illustrates a cross section of a further embodiment of the precession flow meter.

FIG. 6 illustrates another cross section of the precession flow meter shown in FIG. 5.

FIG. 7 illustrates a cross section of yet another embodiment of the precession flow meter.

DESCRIPTION OF THE ILLUSTRATED EMBODIMENTS

In FIG. 1 there is illustrated a cross section of an embodiment of the precession flow meter constructed in accordance with the principles of the present invention, which cross section is taken along a plane including the central axis of the flow meter. The precession flow meter includes a conical shell 1 with a closed converging extremity 2 and a capped diverging extremity 3. The capped diverging extremity 3 of the conical shell includes a centrally disposed fluid inlet 4 connected to an inlet tube 5 that is rigidly anchored to a supporting structure 6. An outlet tube 7 coaxially disposed within the inlet tube 5 extends into the inside of the conical shell 1 through the fluid inlet 4 and is terminated near the converging extremity 2 of the conical shell where it provides a fluid outlet. A plurality of spiral flow guides 9 are disposed in an axisymmetric radial pattern intermediate the capped diverging extremity 3 of the conical shell 1 and a flow deflector disc 10 disposed adjacent and parallel thereto. Means for imposing oscillatory movements to the converging extremity 2 of the conical shell 1 on a first plane including the central axis of the conical shell includes one or more electromagnets 11 and 12, and a magnetically reacting member 13 rigidly affixed to the diverging end of the conical shell 1. Means for sensing the magnitude of the vibratory movements of the converging extremity 2 of the conical shell 1 on a second plane including the central axis of the conical shell 1 and perpendicular to said first plane includes a signaling means 14 and sensing means 15, which will be further described in conjunction with FIG. 3.

In FIG. 2 there is illustrated another cross section of the embodiment shown in FIG. 1 taken along a plane 2-2 as shown in FIG. 1. The plurality of spiral flow guides 9 disposed in an axisymmetric radial pattern with respect to the central axis of the conical shell 1 may be affixed to the flow deflector disc 10 or the capped end 3 of the conical shell 1 or to both elements. It should be mentioned that a desirable construction should be employed in arranging the outlet tube 7, spiral flow guides 9 and the flow deflector disc 10 in order to satisfy the design requirement that makes the combination of the aforementioned elements 7, 9 and 10 mechanically linked to or isolated from the oscillatory movements of the combination including the conical shell 1 and the portion of the inlet tube 5 intermediate the diverging extremity 3 of the conical shell 1 and the anchoring structure 6.

In FIG. 3 there is illustrated a further cross section of the embodiment shown in FIG. 1 taken along a plane 3-3 as shown in FIG. 1. The one or more electromagnets 11 and 12 powered by an alternating electric current vibrates the magnetically reacting element 13. The signaling means 14 affixed to the magnetically reacting element 13 or to the converging end of the conical shell 1 may be a permanent magnet bar and the sensing means 15 and 16 may be one or more induction coils that generate electromotive force as the magnetic bar 14 moves in and out of the core of the induction coils. It should be understood that there are many different methods and means available for measuring the magnitude and/or frequency of the vibratory movements of the converging end of the conical shell 1, which is a matter of design to be elected by the professional designers designing the precession flow meter taught by the present invention. The combination of the permanent magnet and the induction coils shown in the illustrated embodiment is an example of such matter of design. Consequently, the practice of the present invention is not limited to such an illustrated example. Means for measuring the amplitude and/or frequency of the vibratory movements of the converging end of the conical shell 1 may include a device measuring the electromotive force or electric current generated by the induction coils 15 and/or 16, which measurement is then converted to flow rate data by a data processing means. The black box 17 represents the combination of the aforementioned means, which may include data display means 18 and data transmission means 19.

The precession flow meter shown in FIGS. 1, 2 and 3 operates in the following principles : The fluid medium flowing into the conical shell 1 through the inlet tube 5 is imposed with a spinning movement about the central axis of the conical shell 1 by the plurality of the spiral flow guides 9. As the fluid medium with an angular momentum approaches the converging end 2 of the conical shell 1, the spinning movement of the fluid medium rapidly gains intensity in accordance with the law of the conservation of angular momentum. The fluid medium under a high intensity spinning movement leaves the conical shell 1 through the outlet tube 7 coaxially disposed within the combination of the conical shell 1 and the inlet tube 5. The fluid under a high spin as it flows through the conical shell 1 is lietrally a fluid top that behaves much like a spinning top. When the angular momentum vector of the spinning fluid in the conical shell 1 that is parallel to the central axis of the conical shell 1 is imposed upon by an additional angular momentum vector perpendicular to the central axis of the conical shell 1 that is generated by the oscillatory movements of the converging end of the conical shell 1 created by the electromagnets of alternating currents, there results a precession torque vector with direction perpendicular to the angular momentum vector representing the spinning movement of the fluid in the conical shell and perpendicular to the imposed angular momentum associated with the oscillatory movements of the converging end of the conical shell 1 relative to the diverging end thereof, of which magnitude is proportional to the angular momentum vector of the spinning fluid in the conical shell 1 that is, in turn, proportional to the mass flow rate of the fluid medium flowing through the conical shell, multiplied by the product of the amplitude and frequency of the oscillatory movement imposed on the converging end of the conical shell by the electromagnets. Consequently, for given value of the amplitude and frequency of the oscillatory movements of the converging end of the conical shell created by the electromagnets, the magnitude of the precession torque is porportional to the mass flow rate of the fluid flowing through the conical shell 1, which precession torque creates vibratory movements of the converging end of the conical shell in a direction prependicular to the oscillatory movements thereof created by the electromagnets, wherein the magnitude of the vibratory movements is porportional to the mass flow rate of the fluid medium. Therefore, the measurements of the magnitude of the aforementioned vibratory movements enables it to measure the mass flow rate of the fluid medium flowing through the flow meter comprising the elements shown in FIGS. 1, 2 and 3.

It should be understood that the means for imposing the oscillation and the means for measuring the magnitude of the vibration of the converging end of the conical shell may include arrangements different from those shown in the illustrated embodiments. It should be also understood that the cap covering the diverging end of the conical shell may be a conical cap instead of a flat cap. It is also evident that the roles of the converging and diverging end of the conical shell can be reversed in such a way that the inlet and outlet tubes are connected to the converging end of the conical shell and the means for imposing and measuring vibratory movements are installed at the diverging ends of the conical shell. It should be mentioned that the oscillatory movements of the converging or diverging end in either arrangement may be imposed at a resonance frequency of the mechanical system including the conical shell assembly and the fluid therein, for such vibrations at a resonance frequency generates the precession torque alternating at the resonance frequency that creates the resulting vibration of the conical shell taking place at the resonance frequency, which enables one to measure a very low flow rate of a gaseous medium.

In FIG. 4 there is illustrated a cross section of another embodiment of the precession flow meter of the present invention constructed essentially in the same way as the embodiment shown in FIGS. 1, 2 and 3 with two exceptions, which are, firstly, the portion of the inlet tube 20 intermediate the conical shell and the anchoring structure comprises a bellows construction that facili- tates the oscillatory movements of the converging end of the conical shell at a particular resonance frequency and, secondly, the flow deflector 21 comprises a conical guide that guides the spinning fluid following the wall of the conical shell. In this embodiment, it is also possible to reverse the role of the converging and diverging ends of the conical shell as described in conjunction with the embodiments shown in FIGS. 1, 2 and 3.

In FIG. 5 there is illustrated a cross section of a further embodiment of the precession flow meter constructed in accordance with the principles of the present invention, which is constructed in a way similar to those devices shown in FIGS. 1 and 4 with a few exceptions and operates in the same principles as those described in conjunction with FIGS. 1, 2 and 3. The conical shell 22 including a conical flow deflector-guide 23 and a plurality of spiral flow guides 24 has a fluid inlet tube 25 extending from the center of the capped diverging end 26 of the conical shell 22 wherein the inlet tube 25 is anchored to a first supporting structure 27. The fluid outlet tube 28 extending from the converging end 29 of the conical shell 22 is anchored to a second supporting structure 30. Means for imposing oscillatory movements on the converging extremity of the conical shell such as one or more electromagnets 31 and 32 and means for measuring the precession torque or torsion such as the induction coil 33 are disposed adjacent to one extremity of the fluid outlet tube 28 connected to the converging end of the conical shell 22.

In FIG. 6 there is illustrated another cross section of the embodiment shown in FIG. 5 taken along plane 6—6 as shown in FIG. 6, which cross section further illustrates the arrangements of the means for imposing the oscillatory movements on the converging extremity of the conical shell 22 and the means for measuring the precession torque or torsion. In this illustrative embodiment presented as an example of arranging the aforementioned means, one or more electromagnets 31 and 32 energized by alternating electric currents imposing oscillatory forces on a pair of magnetically reacting plates 34 and 35 affixed to the wall of the fluid outlet tube 28 constitutes the means for imposing oscillatory movements in a first direction perpendicular to the central axis of the combination including the inlet tube-conical shell-outlet tube arranged in line. The pair of permanent magnets 36 and 37 respectively extending from the magnetically reacting plates 34 and 35 and slidably engaging the core of the pair of induction coils 38 and 39, respectively, constitutes the means for measuring the precession torque or the vibratory movements of the converging extremity of the conical shell in a second direction perpendicular to said first direction and perpendicular to the central axis of the precession flow meter assembly. It should be understood that the means for imposing the oscillatory movements may comprise one electromagnet and one or more biasing mechanical springs instead of two electromagnets, which alternate arrangement may be also applied to the precession flow meters shown in FIGS. 1, 4 and 7. The means for measuring precession torque or vibratory movements of the converging end of the conical shell may comprise one induction coil instead of two or other devices designed to measure the position or velocity or acceleration of the target employed in place of the permanent magnet 36 or 37.

In FIG. 7 there is illustrated a cross section of yet another embodiment of the precession flow meter that is constructed essentially in the same way as the embodiment shown in FIG. 5 with two exceptions being that, firstly, the flow deflector disc 40 with round edge 41 is employed in place of the coni cal flow the deflector-guide employed in FIG. 5 and, secondly, the portions of inlet tube 42 and outlet tube 43 intermediate the respective supporting structures 44, 45 and the conical shell are constructed in bellowing structures 46 and 47, respectively. It should be understood that only one of two tubes may be provided with the bellows construction.

While the principles of the present invention have now been made clear by the illustrative embodiments, it will be immediately obvious to those skilled in the art many modifications in the structures, arrangements, proportion, elements and materials which are particularly adapted to the specific working environments and operating conditions in the practice of the invention without departing from those principles.

I claim:

1. A device for measuring flow rate comprising in combination:

(a) a flow passage assembly comprising a conical shell with closed converging extremity and capped diverging extremity including a substantially centrally located inlet port disposed through said capped diverging extremity of said conical shell and extending to an inlet tube, and an outlet tube coaxially routed and extending through said inlet port into inside of said conical shell in a substantially coaxial relationship and terminated near said closed converging extremity, wherein flow guide means disposed adjacent to said inlet port for imposing rotating movements on fluid medium entering through said inlet port and guiding said fluid medium toward the wall of said conical shell is included;

(b) means for securing said inlet tube;

(c) means for imposing oscillatory movements on said closed converging extremity of said conical shell in a first direction substantially perpendicular to the central axis of said conical shell; and (d) means for measuring vibratory movements of said closed converging extremity of said conical shell in a second direction substantially perpendicualr to the central axis of said conical shell and to said first direction, said vibratory movements being generated by dynamic interaction between rotating motion of fluid in said conical shell and said oscillatory movements of said closed converging extremity of said conical shell.

2. The combination as set forth in claim 1 wherein said combination includes means for converting output from said means for measuring vibratory movements to flow rate measurement data indicating flow rate of the fluid medium flowing through said flow passage assembly.

3. The combination as set forth in claim 2 wherein said combination includes means for displaying said flow measurement data.

4. The combination as set forth in claim 2 wherein said combination includes means for transmitting said flow measurement data as an input to other flow control devices.

5. The combination as set forth in claim 2 wherein said means for imposing oscillatory movements on said closed converging extremity of said conical shell operates substantially at a resonance frequency of said flow passage assembly containing fluid medium flowing through said flow passage assembly.

6. The combination as set forth in claim 1 wherein a portion of said inlet tube is constructed in bellows structures intermediate said capped diverging extremity of said conical shell and said means for securing said flow passage assembly.

7. The combination as set forth in claim 6 wherein said combination includes means for converting output from said means for measuring vibratory movements to flow rate measurement data indicating flow rate of the fluid medium flowing through said flow passage assembly.

8. The combination as set forth in claim 7 wherein said combination includes means for displaying said flow measurement data.

9. The combination as set forth in claim 7 wherein said combination includes means for transmitting said flow measurement data as an input to other flow control devices.

10. The combination as set forth in claim 7 wherein said means for imposing oscillatory movements on said closed converging extremity of said conical shell operates substantially at a resonance frequency of said flow passage assembly containing fluid medium flowing through said passage assembly.

11. A device for measuring flow rate comprising in combination:
   (a) a flow passage assembly comprising a conical shell with converging extremity including an outlet port extending to an outlet tube disposed substantially in line with said conical shell and capped diverging extremity including a substantially centrally located inlet port disposed through said capped diverging extremity and extending to an inlet tube disposed substantially in line with said conical shell, wherein flow guide means disposed adjacent to said inlet port for imposing rotating movements on fluid medium entering through said inlet port and guiding said fluid medium toward the wall of said conical shell is included;
   (b) means for securing said flow passage assembly by securing a portion of said inlet tube and by securing a portion of said outlet tube;
   (c) means for imposing oscillatory movements on combination of said converging extremity of said conical shell and a portion of said outlet tube adjacent to said converging extremity of said conical shell in a first direction substantially perpendicular to the central axis of said conical shell; and
   (d) means for measuring vibratory movements of combination of said converging extremity of said conical shell and a portion of said outlet tube adjacent to said converging extremity of said conical shell in a second direction substantially perpendicular to the central axis of said conical shell and to said first direction, said vibratory movements being generated by dynamic interaction between rotating movements of fluid within said flow passage assembly and said oscillatory movements of combination of said converging extremity of said conical shell and a portion of said outlet tube adjacent to said conical shell.

12. The combination as set forth in claim 11 wherein said combination includes means for converting output from said means for measuring vibratory movements to flow rate measurement data indicating flow rate of the fluid medium flowing through said flow passage assembly.

13. The combination as set forth in claim 12 wherein said combination includes means for displaying said flow measurement data.

14. The combination as set forth in claim 12 wherein said combination includes means for transmitting said flow measurement data as an input to other flow control devices.

15. The combination as set forth in claim 12 wherein said means for imposing oscillatory movements on said closed converging extremity of said conical shell operates substantially at a resonance frequency of said flow passage assembly containing fluid medium flowing througn said flow passage assmebly 16. The combination as set forth in claim 11 wherein portion of at least one of said inlet tube and said outlet tube is constructed in bellows structures intermediate said conical shell and said means for securing said flow passage assembly.

17. The combination as set forth in claim 16 wherein said combination includes means for converting output from said means for measuring vibratory movements to flow rate measurement data indicating flow rate of the fluid medium flowing through said flow passage assembly.

18. The combination as set forth in claim 17 wherein said combination includes means for displaying said flow measurement data.

19. The combination as set forth in claim 17 wherein said combination includes means for transmitting said flow measurement data as an input to other flow control devices.

20. The combination set forth in claim 17 wherein said means for imposing oscillatory movements on said closed converging extremity of said conical shell operates substantially at a resonance frequency of said flow passage assembly containing fluid medium flowing through said passage assembly.

* * * * *